(12) United States Patent
Ujimoto

(10) Patent No.: US 8,857,287 B2
(45) Date of Patent: Oct. 14, 2014

(54) VEHICLE SHIFTER

(75) Inventor: Takushi Ujimoto, Fuchu-cho (JP)

(73) Assignee: Delta Kogyo Co., Ltd., Aki-gun (JP)

( * ) Notice: Subject to any disclaimer, the term of this patent is extended or adjusted under 35 U.S.C. 154(b) by 306 days.

(21) Appl. No.: 13/451,662

(22) Filed: Apr. 20, 2012

(65) Prior Publication Data

US 2012/0291581 A1 Nov. 22, 2012

(30) Foreign Application Priority Data

May 17, 2011 (JP) ................................. 2011-109982

(51) Int. Cl.
*B60K 20/00* (2006.01)
*F16H 59/04* (2006.01)
*F16H 61/36* (2006.01)
*F16H 59/02* (2006.01)

(52) U.S. Cl.
CPC ................ *F16H 59/04* (2013.01); *F16H 61/36* (2013.01); *F16H 2059/0295* (2013.01)
USPC ...................... 74/473.33; 74/473.35; 74/473.3

(58) Field of Classification Search
CPC ....... F16H 61/36; F16H 59/04; F16H 59/042; F16H 2059/0269; F16H 2059/0295
USPC .................. 74/473.1, 473.15, 473.3, 473.33, 74/473.34, 473.35
See application file for complete search history.

(56) References Cited

U.S. PATENT DOCUMENTS

| | | | | |
|---|---|---|---|---|
| 3,323,387 A * | 6/1967 | Hurst, Jr. et al. | ............. | 74/473.3 |
| 5,505,103 A * | 4/1996 | Nordstrom et al. | .......... | 74/473.3 |
| 5,706,702 A | 1/1998 | Yamada | | |
| 5,845,536 A * | 12/1998 | Certeza | ...................... | 74/473.26 |
| 6,817,263 B2 * | 11/2004 | Miguchi | ...................... | 74/473.3 |
| 6,923,084 B2 * | 8/2005 | Kramer et al. | ............. | 74/473.33 |
| 2003/0213326 A1 * | 11/2003 | Fett et al. | ...................... | 74/473.3 |
| 2011/0036195 A1 * | 2/2011 | Bruder et al. | ............... | 74/473.33 |

FOREIGN PATENT DOCUMENTS

| | | |
|---|---|---|
| DE | 44 28 206 Al | 11/1995 |
| JP | 62-67831 | 4/1987 |

* cited by examiner

*Primary Examiner* — Troy Chambers
*Assistant Examiner* — Jake Cook
(74) *Attorney, Agent, or Firm* — Gerald E. Hespos; Michael J. Porco; Matthew T. Hespos

(57) ABSTRACT

A vehicle shifter 1 comprises a shifter body 2, a shift lever 3, an interlocking member 4, and a selecting return spring 5 serving as a biasing member. The interlocking member 4 is configured such that a front end thereof is pivotally supported by the shifter body 2, and a rear end thereof is swingingly movable around the front end as a swing center during a manual operation for moving the shift lever 3 in a selecting direction. The selecting return spring 5 is configured to pull the rear end of the interlocking member 4 toward a rear end thereof.

5 Claims, 4 Drawing Sheets

VEHICLE SHIFTER

BACKGROUND OF THE INVENTION

1. Field of the Invention

The present invention relates to a shifter for a vehicle such as an automobile.

2. Description of the Related Art

Heretofore, there has been widely known a manual transmission shifter for a vehicle, such as a type disclosed, for example, JP-U 62-67831 A (hereinafter referred to as "Patent Document 1").

The Patent Document 1 discloses a mechanism for returning a shift lever manually operated and moved in a selecting direction (a vehicle width direction, a Z-W direction in FIGS. 2 and 3), to its original position by means of a selecting return spring. Specifically, as illustrated in FIG. 4A, the selecting return spring 100 comprises two locking pieces 100a, 100b formed in spaced-apart relation to each other. A select arm 101 provided on the shift lever, and a spring stopper portion 102 integrally formed from a shifter body (holding plate) by bending, are disposed between the locking pieces 100a, 100b, while being brought into contact with and locked to the respective locking pieces 100a, 100b. Then, for example, when the shift lever located in a neutral position is moved in the selecting direction, the select arm 101 interlockingly with the movement, so that one of the locking pieces 100a of the selecting return spring 100 is held in a contact state with respect to the spring stopper portion 102, and the other locking piece 100b is displaced together with the select arm 101 as indicated by the two-dot chain line in FIG. 4A, while producing a biasing force against the select arm 101, whereby the shift lever can be returned to the original position by the biasing force.

The mechanism disclosed in the Patent Document 1 has to be fabricated such that each of a diameter of the select arm 101 and a width of the spring stopper portion 102 becomes equal to a distance between the locking pieces 100a, 100b of the selecting return spring 100 so as to allow each of the select arm 101 and the spring stopper portion 102 to come into contact with the selecting return spring 100. If not, wobbling of the shift lever will occur. For example, in the case where the width of the spring stopper portion 102 is less than the distance between the locking pieces 100a, 100b, a gap 103 is formed between each of the locking pieces 100a, 100b and the spring stopper portion 102, as illustrated in FIG. 4B. Further, in the case where the diameter of the select arm 101 is less than the distance between the locking pieces 100a, 100b, a gap is formed between each of the locking pieces 100a, 100b and the select arm 101, although not illustrated. If such a gap is formed, the shift lever will wobble with amplitude corresponding to the gap 103, which causes deterioration in operational feeling of an operator or driver. Therefore, it is necessary to accurately fabricate the mechanism with tighter dimensional accuracy in each of the width (diameter) of the select arm 101, the width of the spring stopper portion 102 and the distance between the locking pieces 100a, 100b of the selecting return spring 100, which leads to a higher level of difficulty in fabrication and an increase in time required for fabrication. Moreover, even if each of the components is accurately fabricated, a gap similar to the gap 103 will be formed due to fabrication tolerances of the components such as the select arm 101, the spring stopper portion 102 and the selecting return spring 100.

It is an object of the present invention to provide a vehicle shifter which is free from a risk of wobbling of a shift lever in a neutral position.

SUMMARY OF THE INVENTION

In order to achieve the above object, the present invention provides a vehicle shifter (1) which comprises: a shifter body (2); a shift lever (3) capable of being manually operated and moved with respect to the shifter body (2) from a neutral position (70) in a selecting direction (Z-W); a biasing member (5) operable, when the shift lever (3) is moved in the selecting direction (Z-W), to bias the shift lever (3) to return it to the neutral position (70); and an interlocking member (4) interlockably coupled with the shift lever (3), wherein: the interlocking member (4) is configured such that a predetermined position thereof is pivotally supported by the shifter body (2), and one end (43) thereof is swingingly movable around the predetermined position as a swing center during the manual operation of the shift lever (3) in the selecting direction (Z-W); and the biasing member (5) is configured to pull the one end (43) of the interlocking member (4) toward a side opposite to the predetermined position.

In this vehicle shifter, the biasing member (5) is configured to pull the one end (43) of the interlocking member (4) toward a side opposite to the predetermined position (41) pivotally supported by the shifter body (2) to serve as a swing center of the interlocking member (4). This makes it possible to avoid wobbling of the shift lever (4) when it is in the neutral position (70), without unduly tightening up dimensional accuracy of each component such as the interlocking member (4).

These and other objects, features, and advantages of the present invention will become apparent upon reading of the following detailed description along with the accompanying drawings.

DETAILED DESCRIPTION OF INVENTION

With reference to the drawings, the present invention will now be specifically described based on an embodiment thereof.

Figure 1:
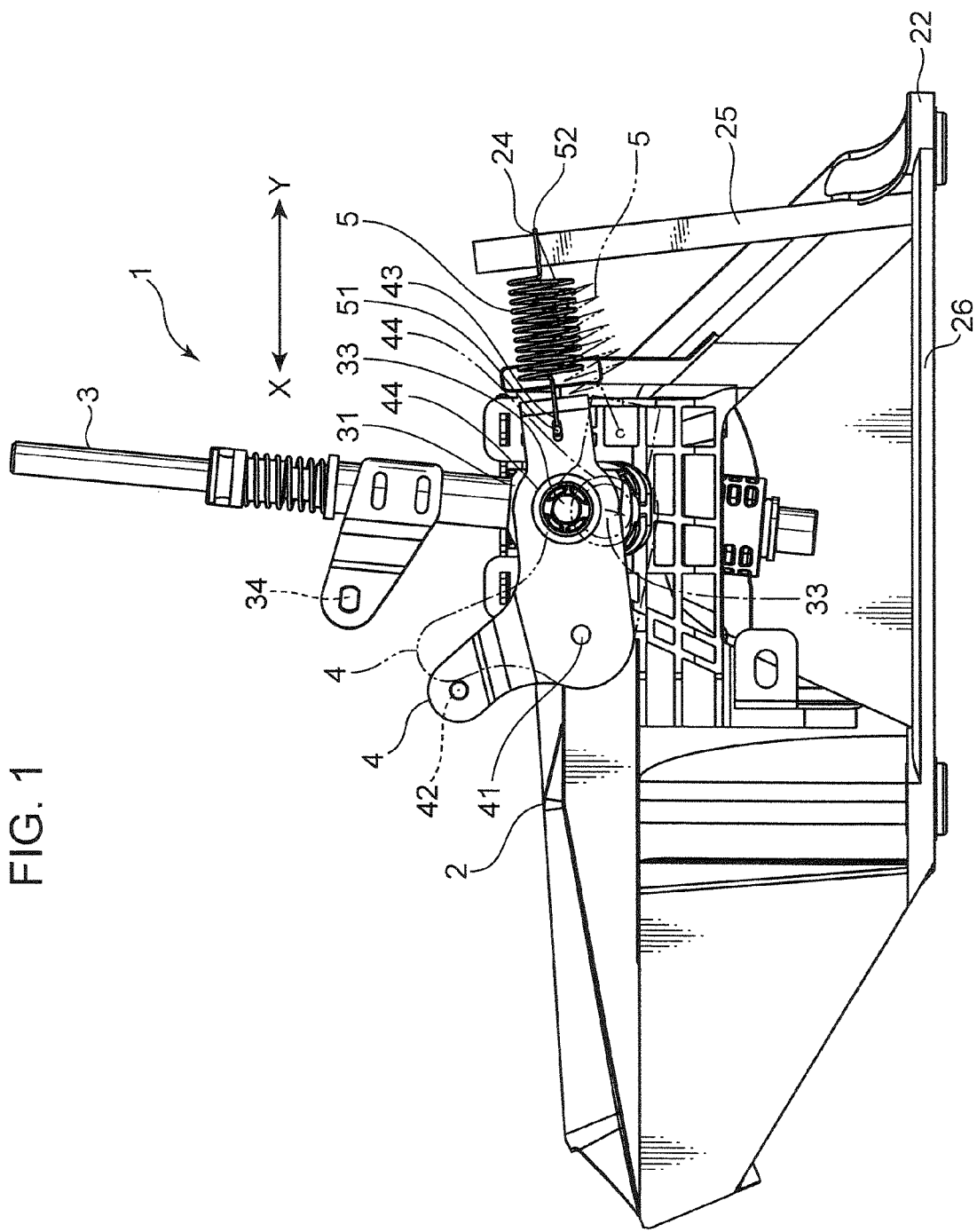
FIG. 1 is a fragmentary side view of a vehicle shifter according to one embodiment of the present invention.
Figure 2:
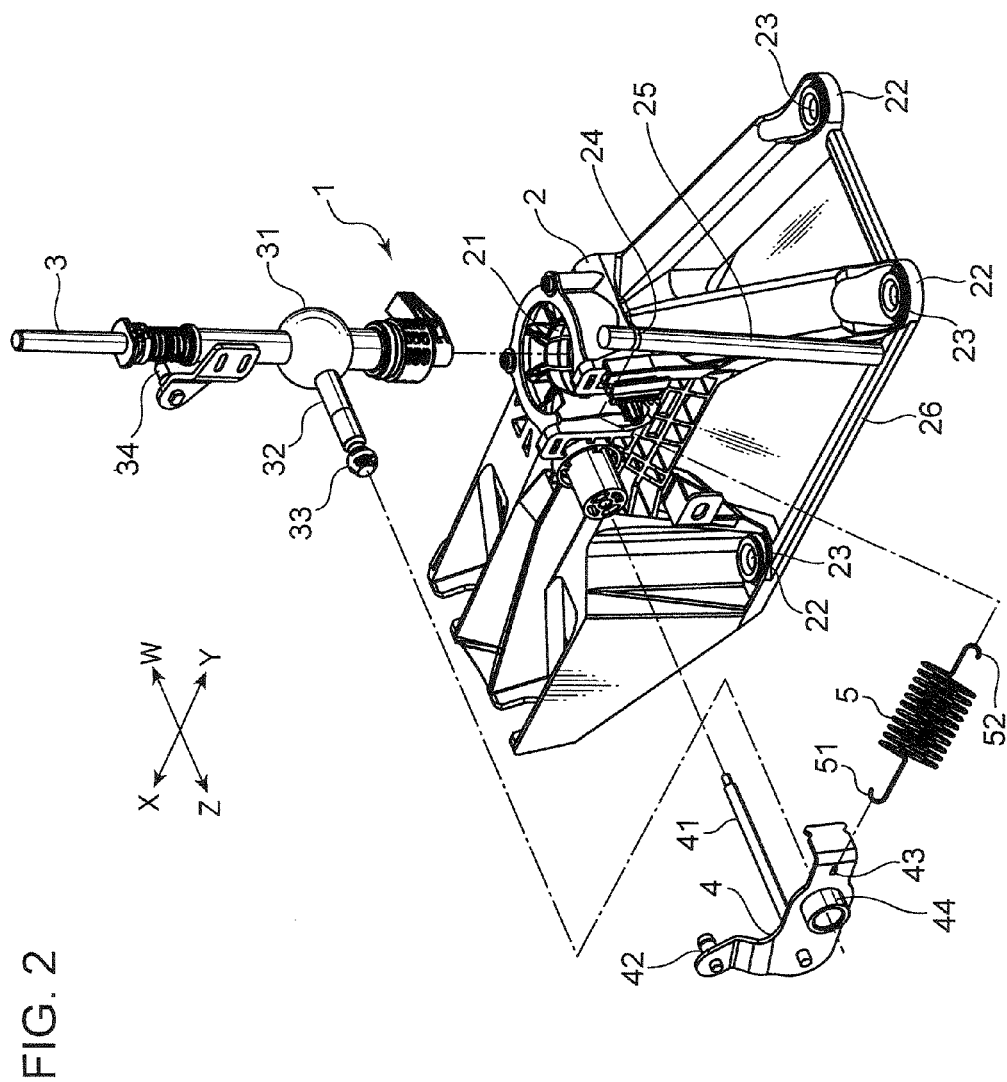
FIG. 2 is an exploded perspective view of the shifter in FIG. 1.

FIG. 1 is a fragmentary side view of a vehicle shifter according to one embodiment of the present invention, and FIG. 2 is an exploded perspective view of the shifter in FIG. 1. The following description will be made on the assumption that the X-direction, Y-direction, Z-direction and W direction in the figures indicate a front direction, a rear direction, a left direction and a right direction, respectively.

The shifter 1 of the present invention is designed for a vehicle manual transmission. As illustrated in FIGS. 1 and 2, the shifter 1 comprises a shifter body 2, a shift lever 3, an interlocking member 4, and a selecting return spring 5 serving as a biasing member.

The shifter body 2 has a lever holding portion 21 provided in an approximately central region thereof in the front-rear direction to hold an aftermentioned spherical portion 31 of the shift lever 3.

The shifter body 2 also has four vehicle attaching portions 22 provided, respectively, in a left front corner, a left rear corner, a right front corner and a right rear corner of a lower end wall thereof, and each adapted to be attached to a vehicle (vehicle body) (in FIG. 2, the vehicle attaching portion in the right front corner does not appear). In this embodiment, each of the vehicle attaching portions 22 is formed with a bolt insertion hole 23 for allowing a mounting bolt (not illustrated) to be inserted there into, to allow the shifter body 2 to be mounted to the vehicle (vehicle body) through the mounting bolts inserted into the respective bolt insertion holes 23.

Further, the shifter body 2 at its left rear portion is provided with a supporting pole 25 having a biasing-member (spring) locking portion 24 for locking the selecting return spring 5. The supporting pole 15 is provided on a lower frame piece 26 of the shifter body 26 to extend upwardly from the lower frame piece 26.

The biasing-member locking portion 24 is composed of a groove formed in an upper portion of the supporting pole 25 at a predetermined depth along a circumferential direction thereof.

In this embodiment, the shift lever 3 is formed as a straight rod-shaped lever. As illustrated in FIG. 2, the shift lever 3 has a lower portion provided with a spherical portion 31 held by the lever holding portion 21 of the shifter body 2, and a select rod 32.

The select rod 32 is provided on a left side of the spherical portion 31 to extend from the spherical portion 31 in a direction perpendicular to (an axis of) the shift lever 3.

The select rod 32 has a distal end provided with a generally spherical-shaped interlocking-member coupling portion 33 coupled with the interlocking member 4.

The spherical portion 31 is fitted into the lever holding portion 21 of the shifter body 2 from thereabove, and rotatably held by the lever holding portion 21.

In this state, the shift lever 3 is disposed to extend upwardly from the shifter body 2 as illustrated in FIG. 1, in such a manner that it can be manually operated and moved in a selecting direction and a shifting direction. In this embodiment, the shift lever 3 is adapted to be moved to shift between first to fifth speed gears and R (reverse) gear.

Figure 3:
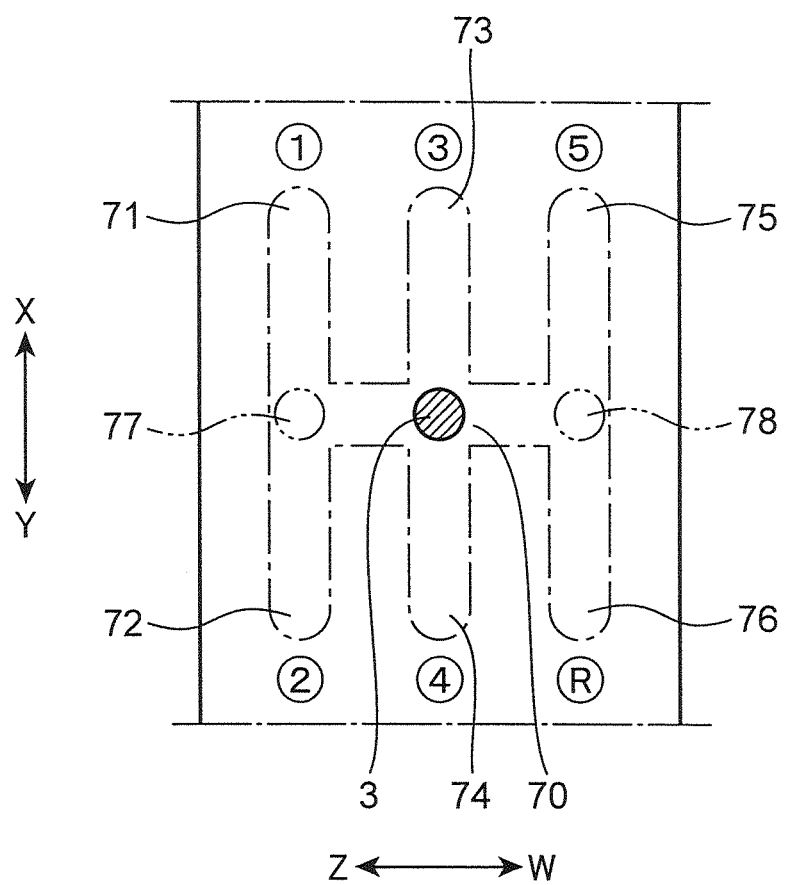
FIG. 3 is an explanatory diagram of an operation of a shift lever.
Figure 4A:
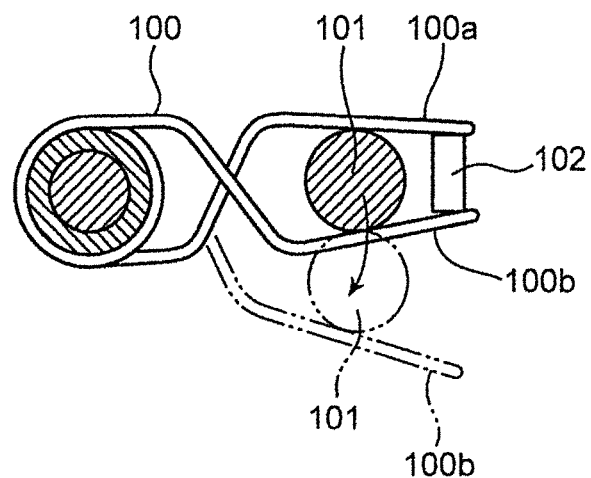
FIG. 4A is a fragmentary partially-sectional explanatory diagram of an example of a conventional shifter.
Figure 4B:
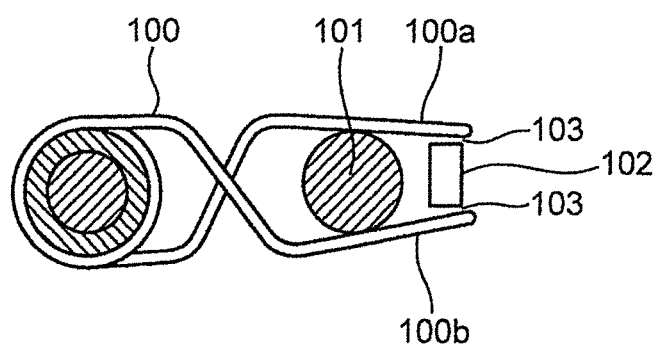
FIG. 4B is an explanatory diagram of a state in which a gap is formed between a locking piece of a selecting return spring and a spring stopper portion, in the conventional shifter.

More specifically, as illustrated in FIG. 3, with respect to a neutral position 70 and the selecting direction (Z-W direction as a left-right direction), the shift lever 3 is moved to a first speed gear position 71 defined on a left front side, a second speed gear position 72 defined on a left rear side, a fifth speed gear position 75 defined on a right front side, and a reverse gear position 76 defined on a right rear side. Further, the shift lever 3 is moved to a third speed gear position 73 and a fourth speed gear position 74 each defined in the shifting direction (X-Y direction as a front-rear direction) with respect to the neutral position 70

The shift lever 3 is not limited to a type adapted to be moved to shift between first to fifth speed gears and R (reverse) gear, but may be appropriately modified. For example, it may be a type adapted to be moved to shift between first to sixth gears and R gear. Although not illustrated, the shift lever 3 is configured such that it is kept from rotating about a shaft center (axis) thereof by around-axis rotation preventing means.

In the above state in which the spherical portion 31 is rotatably held by the lever holding portion 21, the interlocking-member coupling portion 33 of the select rod 32 protrudes leftwardly from the shifter body 2. Then, during the manual operation for moving the shift lever 3 in the selecting direction, the interlocking-member coupling portion 33 is swingingly moved in an up-down direction about the spherical portion 31. On the other hand, during the manual operation for moving the shift lever 3 in the shifting direction, the interlocking-member coupling portion 33 is rotated about a shaft center (axis) of the select rod 32.

As shown in FIG. 2, the shift lever 3 is also provided with a shift cable coupling portion 34 on an upper side of the spherical portion 31, to allow one end of a shift cable (not illustrated) to be coupled thereto. The other end of the shift cable is coupled to a non-illustrated manual transmission.

In this embodiment, the interlocking member 4 is composed of a plate-shaped body having a predetermined thickness. The interlocking member 4 has a shaft 41 provided in a predetermined position on a front side thereof (hereinafter referred to as "predetermined position") and rotatably coupled to the shifter body 2, and a select-cable coupling portion 42 provided on an upper side of the shaft 41 and adapted to be coupled with one end of a select cable (not illustrated). The other end of the select cable coupled to the select-cable coupling portion 42 is coupled to the non-illustrated manual transmission.

Further, the interlocking member 4 has a first locking portion 43 provided at a rear end thereof (hereinafter referred to as "one end") and coupled to the biasing member 5, and a lever coupling portion 44 provided in an intermediate region between the shaft 41 and the first locking portion 43 and rotatably coupled with the interlocking-member coupling portion 33 of the select rod 32.

In this embodiment, the lever coupling portion 44 is composed of a cylindrical body which internally supports the interlocking-member coupling member 33 of the selector rod 32 in a rotatable manner. The cylindrical body 44 has a center (a center of a circle) located on a straight line connecting the shaft center of the shaft 41 ("predetermined position of the interlocking member 4") and the first locking portion 43 of the locking member 4 ("one end of the interlocking member 4").

In this embodiment, the selecting return spring 5 is composed of a coil spring. This coil spring has a second locking portion 51 provided at one (a front one) of axially opposite ends thereof and coupled to the first locking portion 43 of the interlocking member 4, and a shifter-body locking portion 52 provided at the other (rear) end and coupled to the spring locking portion 24 of the shifter body 2.

An operation of the shifter 1 of the present invention will be described below. Firstly, when the shift lever 3 is moved from the neutral position 70 in the selecting direction (one of the Z-direction and the W-direction) as illustrated in FIG. 3, the selecting return spring 5 biases the shift lever 3 toward the neutral position. When the shift lever 3 is in the neutral position 70, the first locking portion 43 is placed in a state in which the interlocking member 4 is pulled rearwardly by the selecting return spring 5, so that a balanced state is established in which the first locking portion 43 of the interlocking member 4 (one end of the interlocking member 4), the shaft 41 (predetermined position of the interlocking member 4), and the shifter-body locking portion 52 (the other end) of the selecting return spring 5, are aligned in a straight line.

As used in this specification, the term "balanced state" means a state in which the interlocking member 4 and the biasing member 5 are kept stable with respect to the shifter body. In other words, the term "balanced state" means a state in which a biasing force of the selecting return spring 5 is minimized. Further, in the balanced state (when the shift lever 3 is in the neutral position 70), a center of the cylindrical body 44 formed in the interlocking member 4 is also aligned in the above straight line, as well as the three portions (the first locking portion 43 of the locking member 4, the shaft center of the shaft 41 and the shifter-body locking portion 52 of the selecting return spring 5).

Then, for example, when the shift lever 3 is manually operated and moved leftwardly from the neutral position 70 to a position 77 between the first speed gear position 71 and the second speed gear position 72 as illustrated in FIG. 3, the interlocking-member coupling portion 33 of the select rod 32 is swingingly moved downwardly as indicated by the two-dot chain lines in FIG. 1.

Along with this swing movement, the lever coupling portion 44 of the interlocking member 4 is pushed downwardly in an interlocking manner, so that the interlocking member 4 is swingingly moved about the shaft 41 in a clockwise direction in FIG. 1, against the biasing force of the selecting return spring 5.

In this state, when a driver releases his/her hand from the shift lever 3, according to the biasing force of the selecting return spring 5, the shift lever 3 is returned to the original neutral position 70 where the balanced state is established.

On the other hand, for example, when the shift lever 3 is manually operated and moved rightwardly from the neutral position 70 to a position 78 between the fifth speed gear position 75 and the reverse gear position 76 as illustrated in FIG. 3, the interlocking-member coupling portion 33 of the select rod 32 is swingingly moved reversely, i.e., upwardly, although not illustrated.

Along with this swing movement, the lever coupling portion 44 of the interlocking member 4 is pushed upwardly in an interlocking manner, so that the interlocking member 4 is swingingly moved about the shaft 41 in a counterclockwise direction in FIG. 1, against the biasing force of the selecting return spring 5.

In this state, when a driver releases his/her hand from the shift lever 3, according to the biasing force of the selecting return spring 5, the shift lever 3 is returned to the original neutral position 70 where the balanced state is established.

The shifter according to the above embodiment is configured such that, when the shift lever 3 comes to the neutral position 70, the interlocking member 4 biased by the selecting return spring 5 is placed in the balanced state (the biasing force of the selecting return spring 5 is minimized). Thus, when the shift lever 3 is slightly moved from the neutral position 70 in the selecting direction, a biasing force (an increased biasing force with respect to the minimum biasing force at the neutral position) can be applied to the shift lever 3.

Thus, it becomes possible to prevent the shift lever 3 from wobbling in the neutral position 70, i.e., prevent the occurrence of a situation where the shift lever 3 wobbles in the neutral position due to fabrication tolerance of each component such as the select arm, as in the conventional shifter, and facilitate fabrication without unduly tightening up dimensional accuracy of each component.

In addition, it is only necessary to lock one selecting return spring 5 to the interlocking member 4 and the spring locking portion 24 of the shifter body 2, from a rear side of the interlocking member 4, so that it becomes possible to simplify installation of the selecting return spring 5.

In the above embodiment, the spherical portion 31 is employed to allow the shift lever 3 to be moved in the selecting direction and the shifting direction with respect to the shifter body. However, the shift lever 3 is not limited to this type, but may be appropriately modified. For example, the shift lever 3 may be a type provided with two shafts. In this case, the two shafts may be configured to be movable, respectively, in the selecting direction and the shifting direction with respect to the shifter body.

SUMMARY OF EMBODIMENTS

The present invention relates to a vehicle shifter 1 which comprises: a shifter body 2; a shift lever 3 capable of being manually operated and moved with respect to the shifter body 2 from a neutral position 70 in a selecting direction (Z-W); a biasing member 5 operable, when the shift lever 3 is moved in the selecting direction (Z-W), to bias the shift lever 3 to return it to the neutral position 70; and an interlocking member 4 interlockably coupled with the shift lever 3, wherein: the interlocking member 4 is configured such that a predetermined position thereof is pivotally supported by the shifter body 2, and one end 43 thereof is swingingly movable around the predetermined position as a swing center during the manual operation of the shift lever 3 in the selecting direction (Z-W); and the biasing member 5 is configured to pull the one end 43 of the interlocking member 4 toward a side opposite to the predetermined position.

In the vehicle shifter of the present invention, the biasing member 5 is configured to pull the one end 43 of the interlocking member 4 toward a side opposite to the predetermined position 41 pivotally supported by the shifter body 2 to serve as a swing center of the interlocking member 4. This makes it possible to avoid wobbling of the shift lever 4 when it is in the neutral position 70, without unduly tightening up dimensional accuracy (tolerance) of each component such as the interlocking member 4.

In a preferred embodiment of the present invention, the biasing member 5 is composed of a coil spring, wherein one end 51 of the biasing member is coupled to the one end 43 of the interlocking member 4, and the other end 52 of the biasing member is disposed on a side opposite to the one end 43 of the interlocking member 4 and coupled to the shifter body 2, and wherein the biasing member 5 is configured to bias the shift lever 3 toward the neutral position, in such a manner that, when the shift lever 3 comes to the neutral position 70, the predetermined position 41 of the interlocking member 4, the one end 43 of the interlocking member 4 and the other end 52 of the biasing member 5 are aligned approximately in a straight line.

According to this feature, when the shift lever 3 is in the neutral position 70, (i) the predetermined position 41 of the interlocking member 4, (ii) the one end 43 of the interlocking member 4 and (iii) the other end 52 of the biasing member 5 are aligned approximately in a straight line, and the interlocking member 4 biased by the biasing member 5 is placed in a balanced state (a biasing force of the biasing member 5 is minimized). Thus, when the shift lever 3 is slightly moved from the neutral position 70 in the selecting direction, an increased biasing force can be applied to the shift lever 3.

Thus, it becomes possible to prevent the shift lever 3 from wobbling in the neutral position 70. Further, in this vehicle shifter, the biasing member 5 may be composed of a single coil spring. In this case, it is only necessary to lock a front end 51 of the coil spring to a rear locking portion 43 of the interlocking member 4 and lock a rear end 52 of the coil spring to a spring locking portion 24 of the shifter body 2, so that it becomes possible to simplify installation of the selecting return spring 5.

In a preferred embodiment of the present invention, the interlocking member 4 includes a lever coupling portion 44, and the shift lever 3 includes an interlocking-member coupling member 33 interlockably coupled with the lever coupling portion 44.

According to this feature, the interlockingly coupled state between the shift lever 3 and the interlocking member 4 can be realized by a simple structure.

In the above preferred embodiment, the lever coupling portion 44 may be a cylindrical body which internally supports the interlocking-member coupling member 33 of the shift lever 3 in a rotatable manner, wherein the cylindrical body has a center located on a straight line connecting the predetermined position 41 of the interlocking member 4 and the one end 43 of the interlocking member 4.

According to this feature, the interlocking-member coupling member 33 of the shift lever 3 can be rotatably supported by an inner portion of the cylindrical body 44 of the interlocking member 4. Thus, a mechanism for converting a displacement of the shift lever 3 during a shift operation to a swing movement of the interlocking member 4 can be realized by a simple structure.

In the above preferred embodiment, the vehicle shifter may be configured such that, when the shift lever 3 is manually operated in the selecting direction (W-Z), the interlocking-member coupling member 33 is moved interlockingly with the cylindrical body 44 of the interlocking member 4 to swingingly move the interlocking member 4 about the predetermined position 41.

According to this feature, along with the manual operation of the shift lever 3 in the selecting direction, the interlocking member 4 can be swingingly moved about the predetermined position. In other words, along with the swing movement of the interlocking member 4 about the predetermined position, a biasing force of the biasing member is increased, i.e., a force applied to the shift lever 3 in a direction for returning it to the neutral position is increased.

In the above preferred embodiment, the biasing member 5 may be composed of a coil spring, wherein one end 51 of the biasing member is coupled to the one end 43 of the interlocking member 4, and the other end 52 of the biasing member is disposed on a side opposite to the one end of the interlocking member and coupled to the shifter body 2, and wherein the biasing member 5 is configured to bias the shift lever 3 toward the neutral position, in such a manner that, when the shift lever 3 comes to the neutral position 70, the predetermined position 41 of the interlocking member 4, the center of the cylindrical body 44 formed in the interlocking member 4, the one end 43 of the interlocking member 4 and the other end 52 of the biasing member 5 are aligned approximately in a straight line.

According to this feature, when the shift lever 3 is in the neutral position 70, (i) the predetermined position 41 of the interlocking member 4, (ii) the center of the cylindrical body 44 formed in the interlocking member 4, (iii) the one end 43 of the interlocking member 4 and (iv) the other end 52 of the biasing member 5 are aligned approximately in a straight line, and the interlocking member 4 biased by the biasing member 5 is placed in a balanced state (a biasing force of the biasing member 5 is minimized, and the most stable state). Thus, when the shift lever 3 is slightly moved from the neutral position 70 in the selecting direction, an increased biasing force can be applied to the shift lever 3.

This application is based on Japanese Patent Application Serial No. 2011-109982 filed in Japan Patent Office on May 17, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle shifter comprising:
   a shifter body;
   a shift lever capable of being manually operated and moved with respect to the shifter body from a neutral position in opposite selecting directions;
   an interlocking member rotatably supported by the shifter body and interlockably coupled with the shift lever,
   the interlocking member having a predetermined position that is pivotally supported by the shifter body, and one end of the interlocking member that is spaced from the predetermined position being rotatable around the predetermined position during the manual operation of the shift lever in one of the selecting directions; and
   a biasing member including a tension coil spring having opposite first and second ends, the first end of the tension coil spring being coupled to the one end of the interlocking member, and the second end of the tension coil spring being coupled to the shifter body in a position so that the first end of the tension coil spring is between the predetermined position of the interlocking member and the second end of the tension coil spring and so that the predetermined position of the interlocking member, the one end of the interlocking member and the second end of the tension coil spring are aligned approximately in a straight line with one another with a tension force existing in the tension coil spring when the shift lever is in the neutral position, and the tension force increasing when the shift lever is moved in one of the selecting directions so that the tension coil spring biases the shift lever to return in a direction toward the neutral position.

2. The vehicle shifter as defined in claim 1, wherein the interlocking member includes a lever coupling portion, and the shift lever includes an interlocking-member coupling member interlockably coupled with the lever coupling portion.

3. The vehicle shifter as defined in claim 2, wherein the lever coupling portion is of a cylindrical body which internally supports the interlocking-member coupling member of the shift lever in a rotatable manner, the cylindrical body having a center located on a straight line connecting the predetermined position of the interlocking member and the one end of the interlocking member.

4. The vehicle shifter as defined in claim 3, wherein, when the shift lever is manually operated in the selecting direction, the interlocking-member coupling member is moved interlockingly with the cylindrical body of the interlocking member to swingingly move the interlocking member about the predetermined position.

5. The vehicle shifter as defined in claim 4, wherein, when the shift lever is in the neutral position, the predetermined position of the interlocking member, the center of the cylindrical body formed in the interlocking member, the one end of the interlocking member and the other end of the tension coil spring are aligned approximately in a straight line with one another.

* * * * *